United States Patent

[11] 3,632,117

[72] Inventor Angel P. Villasor
  Pittsburgh, Pa.
[21] Appl. No. 824,762
[22] Filed Mar. 15, 1969
[45] Patented Jan. 4, 1972
[73] Assignee Westinghouse Electric Corporation
  Pittsburgh, Pa.

[54] SEAL LIFT-OFF MECHANISM
  9 Claims, 5 Drawing Figs.
[52] U.S. Cl............................................... 277/3,
  277/15, 277/27, 277/28
[51] Int. Cl....................................... F16j 15/34,
  F16j 15/54
[50] Field of Search............................... 277/3, 27,
  15, 28

[56] References Cited
UNITED STATES PATENTS
3,141,677  7/1964  Williams....................... 277/3
3,495,841  2/1970  Lindeboom................... 277/27

Primary Examiner—Samuel D. Rothberg
Attorneys—A. T. Stratton and Z. L. Dermer

CLAIM: The operation of a controlled leakage faceplate-type seal depends on pressure to develop a hydrodynamic film at its interface. The film prevents actual contact between the seal faces. When the pressure is low, the tendency to slam the seal faces together increases. In order to prevent rubbing the seal faces together, a lift-off system is provided to open the seal at a specified low pressure. When the pressure increases to a specified safe value, the system causes the seal faces to approach each other until the normal operating position is reached.

FIG. I

WITNESSES
Helen M. Farkas
James T. Young

INVENTOR
Angel P. Villasor
BY Zygmund L. Jerney
ATTORNEY

SEAL LIFT-OFF MECHANISM

BACKGROUND OF THE INVENTION

This invention relates, generally, to devices for the sealing of fluids and, more particularly, to controlled leakage seals of the faceplate type.

When a controlled leakage face-type seal is operated at a low pressure, the flow velocity across the seal becomes lower and the hydrodynamic wedging forces are also decreased. The tendency for the seal faces to slam together is high. Thus, a rubbing together of the faces could occur and damage the seal.

An object of the invention is to provide a system for opening a seal member at a predetermined safe, low seal inlet pressure and for returning the seal member to its normal operating position when the seal pressure exceeds a specified value.

Other objects of the invention will be explained fully hereinafter or will be apparent to those skilled in the art.

SUMMARY OF THE INVENTION

At low pressure, the clearance between the faces of a controlled leakage seal of the faceplate type becomes small and the faces approach a position where they may rub together. To prevent such an occurrence, a mechanical-hydraulic system moves the seal ring away from the seal runner when the seal pressure is reduced to a predetermined value. When the pressure is restored, the seal ring is returned to its normal operating position.

BRIEF DESCRIPTION OF THE DRAWINGS

For a better understanding of the nature and objects of the invention, reference may be had to the following detailed description, taken in conjunction with the accompanying drawings, in which.

DESCRIPTION OF PREFERRED EMBODIMENTS

Figure 1:
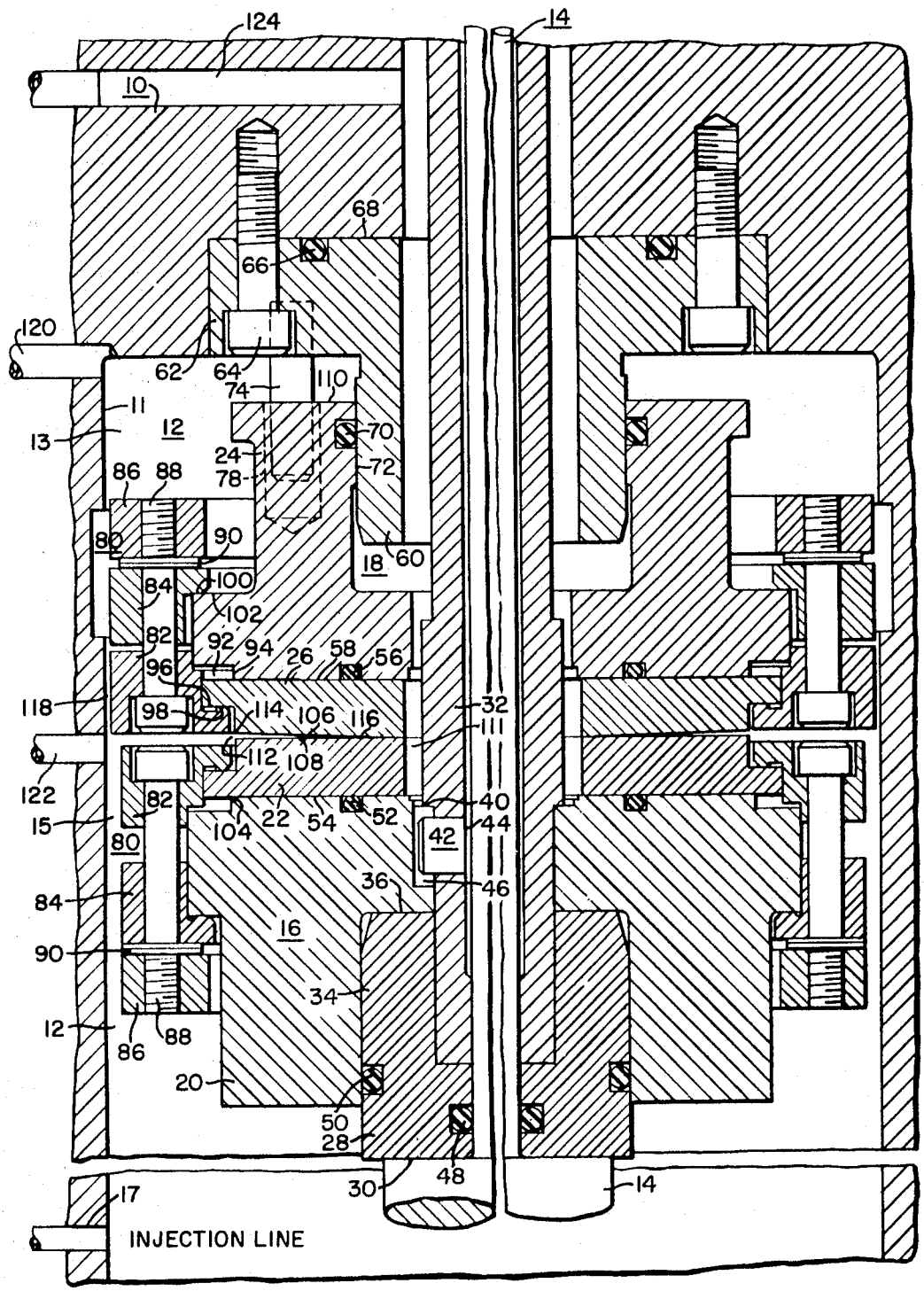
FIG. 1 is a view, in section, of a shaft seal arrangement embodying features of the invention.

Referring to the drawings, particularly FIG. 1, the fluid seal arrangement shown therein may be generally of the type described in U.S. Pat. No. 3,347,552, issued Oct. 17, 1967 to Erling Frisch. More particularly, the seal arrangement shown in FIG. 1 is of the type described in a copending application Ser. No. 729,644, filed May 16, 1968, by Archie MacCrum and assigned to the Westinghouse Electric Corporation. The structure shown comprises a housing 10 having an annular wall 11 spaced from a rotatable shaft 14 to define a pressure chamber 12 within the housing 10, a seal runner assembly 16, and a seal ring assembly 18 disposed within the housing 10 to divide the chamber 12 into a seal ring chamber 13 and a seal inlet chamber 15. The shaft 14 may be driven by a suitable motor (not shown) and utilized to drive the impeller of a centrifugal pump (not shown) which circulates a fluid in a pressurized system. Injection fluid may be supplied to the seal inlet chamber 15 through an injection line 17 at a higher pressure than that developed by the pump. The runner assembly 16 comprises an annular holder 20 and an annular faceplate 22. Likewise, the seal ring assembly 18 comprises an annular holder 24 and an annular faceplate 26.

The holder 20 rotates with the shaft 14 since it is mounted on an annular support 28 which engages a shoulder 30 on the shaft 14 and is secured to the shaft 14 by means of a sleeve 32 which is assembled onto the shaft 14 between the shaft and an upwardly extending leg 34 of the support 28 which is generally L shaped in cross section. A shoulder 36 on the holder 20 rests on the upper end of the leg 34, and a shoulder 40 on the sleeve 32 retains the holder 20 on the support 28. A pin 42 is pressed into a recess 44 in the sleeve 32 and extends into an axial slot 46 in the holder 20. An axial clamping force is exerted on the sleeve 32 and the support 28 from a nut (not shown) which causes the sleeve 32 and the support 28 to rotate with the shaft 14. The pin 42, in turn, causes the holder 20 to rotate with the sleeve 32 which rotates with the shaft. O-ring seals 48 and 50 are provided between the support 28 and the shaft 14 and the holder 20, respectively. An O-ring seal 52 is provided in the interface 54 between the holder 20 and the faceplate 22.

The faceplate 22 is composed of a corrosion-erosion resistant material having substantially the same coefficient of thermal expansion as the material of which the holder 20 is composed. The holder 20 has a high elastic modulus. Likewise, the faceplate 26 is composed of a corrosion-erosion resistant material having substantially the same coefficient of thermal expansion as the material of the holder 24 which has a high elastic modulus. Examples of suitable materials are carbides and ceramics. An O-ring seal 56 is provided in the interface 58 between the holder 24 and the faceplate 26.

The holder 24 is movably mounted on a downwardly extending leg 60 of an annular seal ring insert 62 which is generally L shaped in cross section. The insert 62 is retained in the housing 10 by cap screws 64. An O-ring seal 66 is provided in the interface 68 between the insert 62 and the housing 10. Likewise, an O-ring seal 70 is provided in the interface 72 between the holder 24 and the leg 60 of the insert 62. Rotative movement of the holder 24 is prevented by a pin 74 which is pressed into the insert 62. The pin 74 extends into a well 78 in the holder 24 with sufficient clearance between the wall of the well 78 and the pin 74 to permit axial movement of the holder 24, but limit rotative movement of the holder 24.

The faceplate 26 is attached to the holder 24 by clamping means 80 which includes a retainer ring 82, a clamp ring 84, a lockring 96, a plurality of cap screws 88, and Belleville springs 90 mounted on the cap screws 88 between the lockring 86 and the clamp ring 84. The cap screws 88 extend through the retainer ring 82, the clamp ring 84, the Belleville springs 90 and are threaded into the lockring 86. The interface 58 of the holder 24 is recessed at an outside 92 to provide an annular fulcrum 94 on the interface at an outside diameter which is less than the outside diameter of the interface of the faceplate 26. The retainer ring 82 has an inwardly extending flange with a ridge 98 which engages the portion 96 of the faceplate 26 extending beyond the fulcrum 94. The clamp ring 84 has an inwardly extending flange with a ridge 100 which engages a face 102 on the holder 24. Thus, when the cap screws are tightened to draw the clamp ring 84 and the retainer ring 82 towards each other, a force is produced which exerts a cantilever effect on the faceplate 26 about the fulcrum 94. During the clamping action the Belleville springs 90 are partly compressed and the faceplate 26 is deformed by the clamping force.

The faceplate 22 is attached to the holder 20 by clamping means 80 in a manner similar to that described with reference to the faceplate 26. However, the fulcrum 104 on the interface 54 of the holder 20 is located closer to the outside diameter of the faceplate 22 than is the fulcrum 94 on the holder 24. Thus, the clamping force on the faceplate 22 does not produce as much deformation of the plate about the fulcrum 104 as is produced on the faceplate 106. If desired, the fulcrums 94 and 104 may be placed at the same locations with respect to their corresponding faceplates.

As previously described, the seal ring assembly 18 is mounted for limited axial movement relative to the shaft 14 and the seal runner assembly 16. Also, rotative movement of the seal ring assembly 18 is limited by the antirotational pin 74 which fits loosely in the well 78 in the seal ring holder 24. A seal face 106 on the faceplate 26 is biased toward a confronting seal face 108 on the faceplate 22 by gravity.

As explained in the aforesaid patent, during operation of the pump driven by the shaft 14, surfaces 102 and 110 of the seal ring holder 24 are subjected to the full pressure in the high-pressure chamber 12. It is desirable to provide a pressure barrier between the high-pressure chamber 12 and an annular low-pressure region 111 adjacent the sleeve 32. The seal ring assembly 18 is utilized as the pressure barrier means, but permits a controlled amount of fluid leakage flow to the region 111 from the pressure chamber 12 through a seal gap 112 provided between the confronting seal faces 106 and 108 on the seal plates 26 and 22, respectively.

During operation within a normal pressure range of the system, a balanced or equilibrium position of the axially movable seal ring assembly 18 is maintained in accordance with the pressure on opposing faces of the seal ring assembly. The thickness of the fluid in the gap 112, and consequently the amount of leakage flow through the gap 112 is determined by the configuration of the gap 112.

In order to obtain a self-restoration of the relative position of the seal ring assembly 18 and the runner assembly 16 upon a variation in the seal gap 112, a fluid flow path of decreasing thickness is provided from a high-pressure edge or extremity 114 to a position between the seal face extremity. More specifically in the structure illustrated, the fluid flow path of decreasing thickness extends between the outer edge 114 and an intermediate concentric circle located at 116 on the seal face 106.

As shown in the present structure, the decreasing flow path thickness is formed by tapering the surface 106 slightly away from the confronting surface 108 of the faceplate 22 between the circle 116 and the outer edge 114 of the faceplate 26. The angle between the surfaces 106 and 108 shown in the drawing is exaggerated. This configuration or structure is known as a tapered-face seal. The operation of a seal of this type is fully described in the aforesaid patent to Frisch. Briefly, the operation of the fluid shaft seal depends on the balance of hydrostatic and hydrodynamic pressures acting in the axial direction on the nonrotating seal assembly 18. The flow passage 112 between the faceplate 26 and the rotating runner faceplate 22 is constructed to provide a zero resultant axial force on the seal ring assembly only at the operating clearance. If the system is in equilibrium, any deviation from the operating clearance changes the pressure distribution on the primary seating face 106 on the faceplate 26, causing the seal ring to move back to the equilibrium position.

As explained in the aforesaid copending application, the leakage rate through the flow path 112 is a function of pressure, flow path and temperature. Thus, seals constructed in accordance with the prior art have a low leakage rate at low pressure and a higher leakage rate at high pressure. The seal arrangement disclosed in the aforesaid copending application is constructed to maintain a substantially constant leakage rate with a varying pressure within the normal operating pressure range of the seal arrangement.

As explained in the aforesaid copending application, the manner in which the faceplates 26 and 22 are clamped to their respective holders 24 and 20 produces a deformation of the faceplates about their respective fulcrums 94 and 104. Thus, the shape of the flow path 112 is changed with changes in the operating pressure of the system. The forces acting on the faceplate 26 change due to a change in flow path caused by pressure changes. As also explained in the aforesaid copending application, above a certain pressure, the faceplate 26 is clamped solidly against the holder 24, thereby providing a flow path which produces a lower leakage rate than the flow path which exists at relatively low operating pressures. Thus, the flow path is changed along with the pressure so that a desired leakage rate is maintained at high pressure as well as at low pressure within the normal operating pressure range of the system.

As also explained in the aforesaid copending application, the faceplate 22 may be clamped to the holder 20 so that it is also deformed by the clamping means, but to a lesser degree than the deformation of the faceplate 26. This is determined by the location of the fulcrum 104 for the faceplate 22. Thus, the amount of change in the flow path 112 between the two faceplates with a change in pressure is determined by the locations of the fulcrums for the faceplates and the clamping force applied by the clamping means.

Thus, the seal arrangement described in the aforesaid copending application maintains a substantially constant leakage rate at varying pressure when operating in a relatively high pressure range. However, when the controlled leakage seal is operating at a low pressure, the flow velocity across the seal becomes lower and the hydrodynamic wedging forces are also decreased. The tendency for the seal faces to slam together is high and a rubbing of the faces could occur which would damage the seal faces. To prevent such occurrence, it is necessary to open the seal at a predetermined, safe, low seal inlet pressure. Now, the seal member which is opened at low pressure must be returned to its normal operating position when the seal inlet pressure exceeds a predetermined value.

Figure 3:
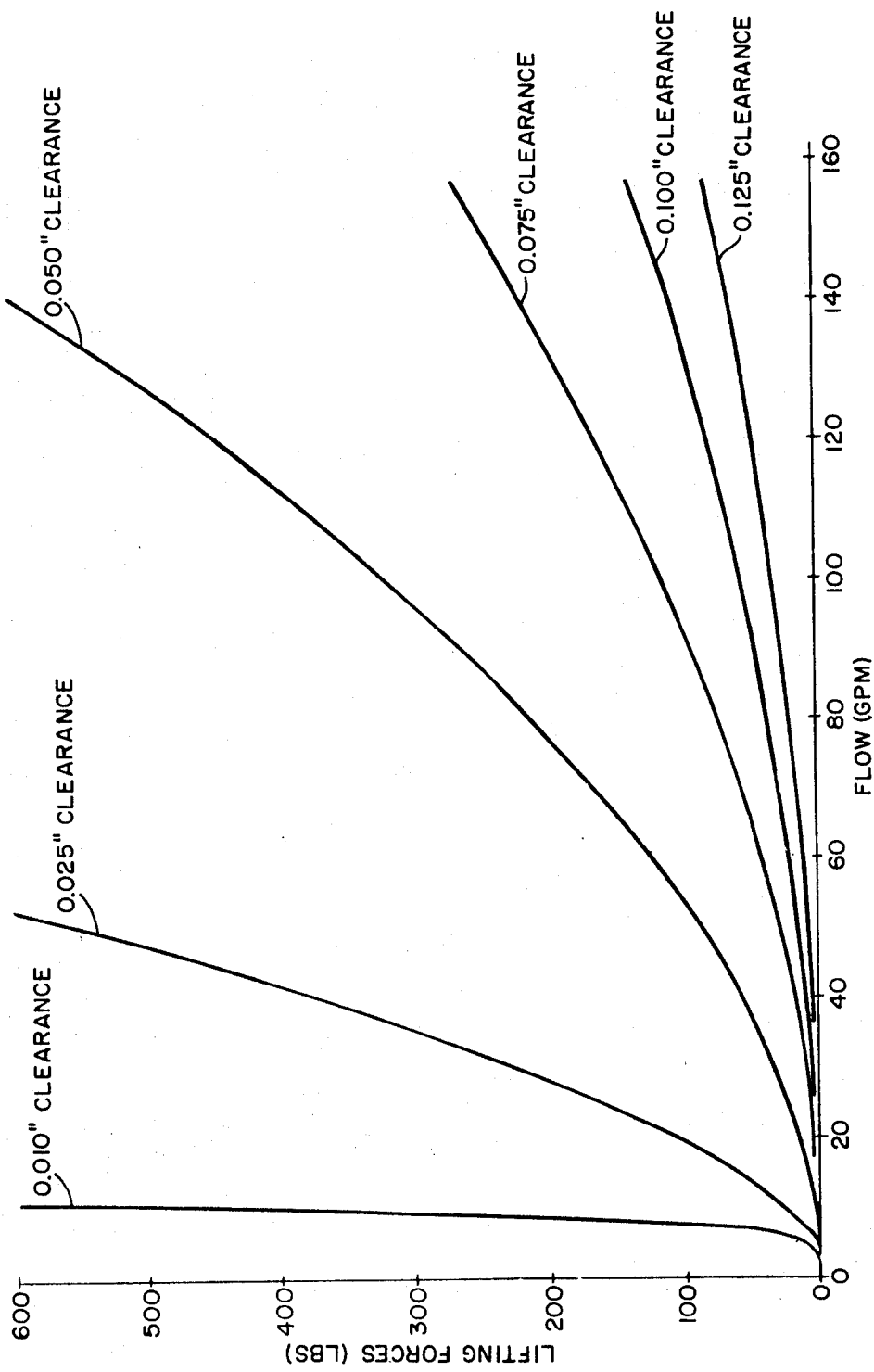
FIG. 3 is a graphic representation of seal lifting forces obtainable with the arrangements shown in FIGS. 1 and 2.

In the modification of the invention shown in FIG. 1, a lift action on the seal ring assembly 18 is achieved by creating a differential pressure across the seal ring assembly. As shown, a restricted passageway 118 is provided between the seal ring assembly 18 and the wall 11 of the housing 10. When fluid flow is permitted through the passageway 118 by opening an outlet pipe 120 from the seal ring chamber 13 a differential pressure across the seal ring 18 is developed and a force is exerted on the seal ring to lift it away from the seal runner 16. As shown by the curves in FIG. 3, the lifting force varies with the clearance in the passageway 118 and the rate of flow through the passageway. In general, the lifting force is increased by decreasing the clearance in the passageway 118.

Figure 2:
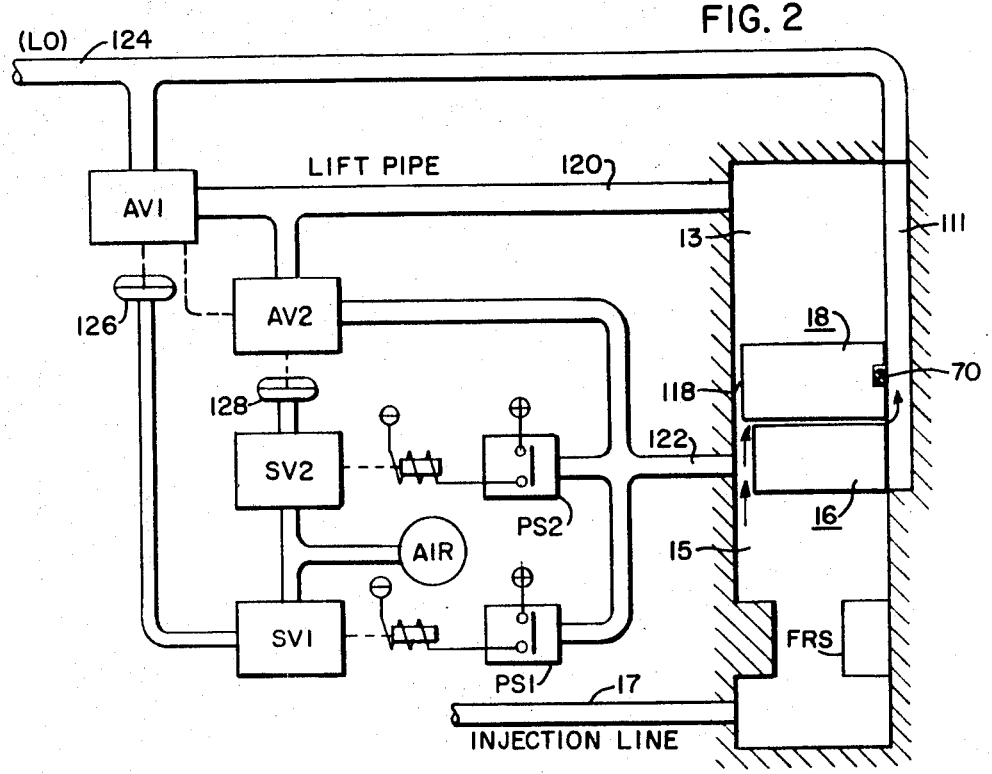
FIG. 2 is a diagrammatic view of a seal lift-off system for the seal arrangement shown in FIG. 1.

The operation of the lift-off system may be understood by referring to FIG. 2. As shown, a pipe 122 connects the seal inlet chamber 15 to pressure operated switches PS1 and PS2, and also to an air-operated valve AV2.

A pipe 120 connects the seal ring chamber 13 to an air-operated valve AV1 which is connected to a leak-off (LO) pipe 124. The valve AV2 is connected to the lift pipe 120. The valves AV1 and AV2 are so interlocked that the normally closed valve AV2 can be opened only after the normally closed valve AV1 has been opened and then reclosed. The pressure switch PS1 controls the operation of a solenoid valve SV1. Likewise, the pressure switch PS2 controls the operation of a solenoid valve SV2. The valve SV1 controls the flow of air to operate the valve AV1 by means of an actuator 126. Likewise, the valve SV2 controls the flow of air to operate the valve AV2 by means of an actuator 128.

During normal operation of the system, the valves AV1 and AV2 are closed and the pressure across the seal ring 18 is substantially balanced. If the pressure in the seal inlet chamber 15 drops to a predetermined value, for example 300 pounds per square inch, the valve AV1 is opened to permit fluid to flow from the seal ring chamber 13 through the pipe 120 into the leak-off pipe 124. As previously explained, the operation of the valve AV1 is controlled by the pressure switch PS1 and the solenoid valve SV1. The flow of fluid through the restricted passageway 118 creates a differential pressure across the seal ring 18 which produces a lifting force on the seal ring and moves it away from the seal runner, thereby preventing the confronting seal faces on the seal ring and the seal runner from rubbing together as a result of the change in hydrodynamic pressure caused by the abnormal drop in pressure in the seal inlet chamber 15. At this time, valve AV2 remains closed in view of the manner in which it is interlocked with the valve AV1 as previously explained.

When the pressure in the seal inlet chamber returns to a predetermined value, for example 350 pounds per square inch the valve AV1 is reclosed under the control of the pressure switch PS1 and the solenoid valve SV1. At this time, the valve AV2 is permitted to open, thereby permitting fluid to flow into the seal ring chamber 13 through the pipes 122 and 120 to restore the pressure balance and return the seal ring 18 to its normal operating position. When the pressure in the seal inlet chamber is returned to a predetermined value, for example 400 pounds per square inch, the valve AV2 is reclosed under the control of the pressure switch PS2 and the solenoid valve SV2. With this sequence, the seal ring 18 is moved away from the seal runner 16 under unsafe low-pressure conditions and is returned to its normal operating position under safe pressure conditions.

Figure 4:
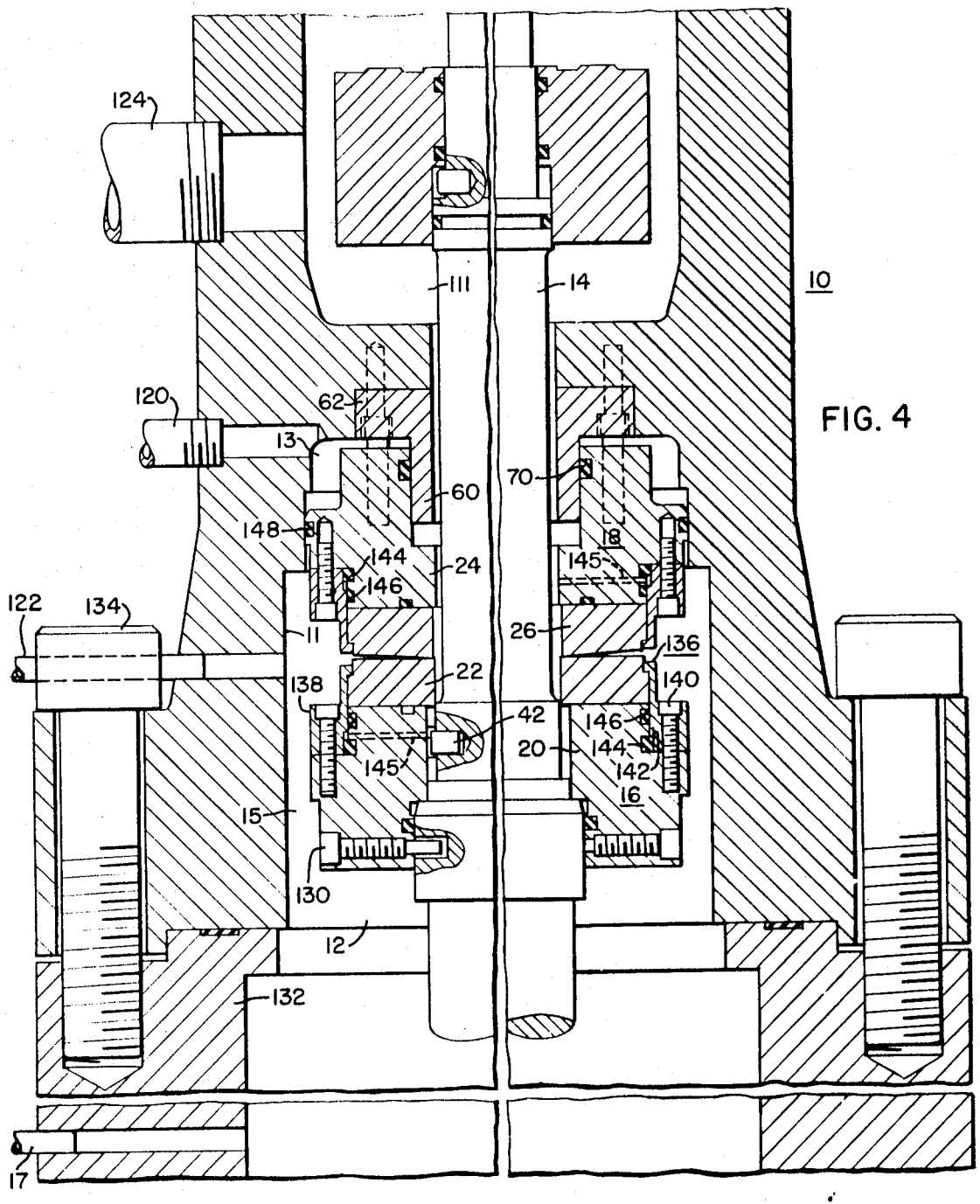
FIG. 4 is a view, in section, of another shaft seal arrangement embodying features of the invention.

The structure shown in FIG. 4 is in general similar to that shown in FIG. 1 with the exception that the seal runner holder 20 is attached directly to the shaft 14 by means of antirotation cap screws 130 and axial lock pins 42. The manner of attaching the housing 10 to a main flange 132 of the pump casing by means of cap screws 134 is also shown in FIG. 4.

In the structure shown in FIG. 4, the seal faceplates 22 and 26 are retained in position by means of hydrostatic clamp assemblies 136. A clamp ring 138 holds the faceplate 22 on its holder 20 by means of cap screws 140. The cap screws are assembled with very small torque and limited axial movement of the clamp ring 138 is possible. The inside surface of the clamp ring 138 is stepped or recessed a slight distance at 142. O-ring seals 144 and 146 statically seal the interface between the holder 20 and the clamp ring 138. Except for the area between the O-rings which is vented at 145 to prevent pressure buildup, the pressure around the clamp is the same. By virtue of the different sealing diameters of the O-rings 144 and 146, a net force pushes the clamp ring against the holder, thereby pressing the faceplate at its outer edge. The force exerted by the clamp varies directly with the system pressure at the seal inlet since the differential sealing area is constant. The clamping arrangement for the faceplate 26 is the same as that for the faceplate 22.

As explained hereinbefore, the operation of the controlled leakage seal depends largely on the taper of the faceplates. Although it is sometimes desirable to taper the seal runner faceplate to compensate for a "rollover effect" of the holder due to pressure usually only the seal ring faceplate is tapered. It is the taper in the flow channel that lets a wedge of fluid keep the seal faces separated. This configuration is termed "- convergent."

All the forces in the hydrostatic clamp arrangement vary linearly with the system pressure and are designed to be in equilibrium at rated operating pressure. The total force variation is a linear function of the seal inlet pressure. In the ideal condition depicted, the faceplate is merely "floating" and remains undistorted. The absence of a net normal force pressing the faceplate against its holder allows the two adjacent pieces to expand or contract differentially in the radial direction, such as occurring during thermal transients. In practice, the equilibrium is not perceptibly disturbed by any pressure change, since all the forces are pressure-dependent.

The foregoing conditions hold true for pressure variations within the normal operating range of the system. As explained hereinbefore, it is necessary to prevent the seal faces from rubbing together if an abnormally low seal inlet pressure should occur. In the arrangement shown in FIG. 4, an O-ring seal 148 cooperates with the wall 11 of the housing 10 to seal the seal ring chamber 13 from the seal inlet chamber 15, thereby preventing the flow of fluid between these chambers. Seal 148 could be of the piston ring type. Pressurized fluid is admitted to the chamber 13 through the pipe 120, thereby establishing a pressure balance across the seal ring assembly 18. When the pipe 120 is opened and the pressurized fluid shut off, the pressure across the seal ring exists. A pistonlike action results which lifts the seal ring assembly 18 away from the seal runner assembly 16. When the pressurized fluid is returned into the chamber 13 through the pipe 120 the seal ring 18 returns to its normal position.

Figure 5:
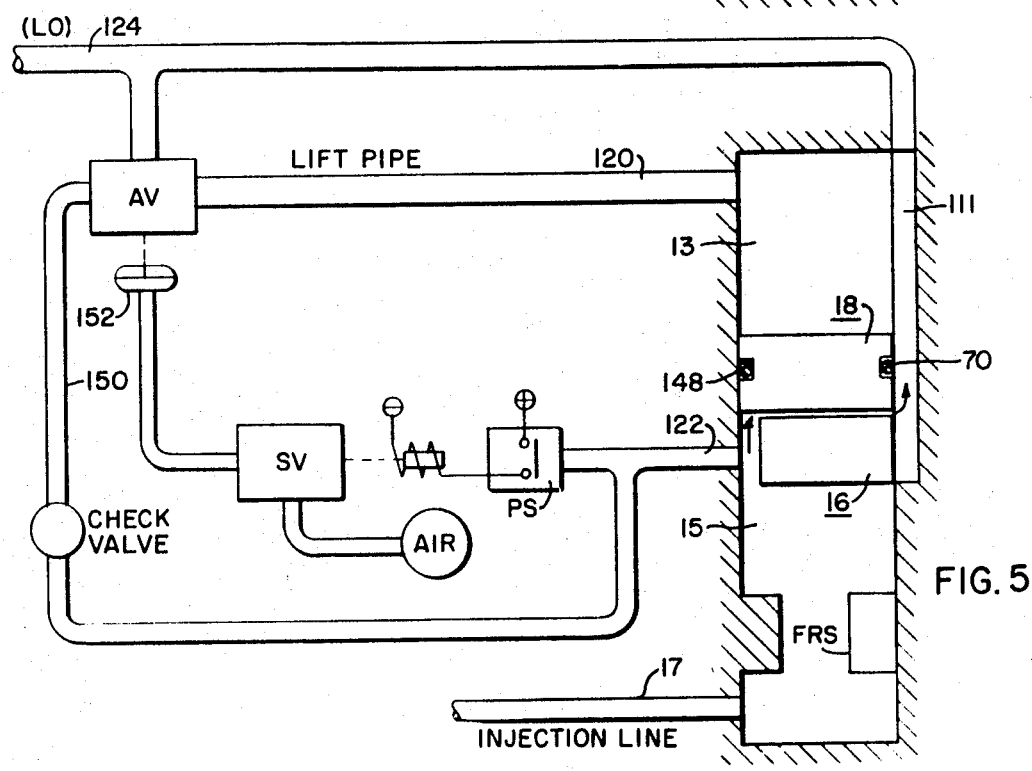
FIG. 5 is a diagrammatic view of a seal lift-off system for the seal arrangement shown in FIG. 4.

The operation of the system may be understood by referring to FIG. 5. A pressure line 150, which may be connected to a suitable source of fluid pressure, such as the seal inlet line 122, is connected to a normally open air valve AV. When the valve AV is open the line 150 is connected to the pipe 120, thereby admitting pressurized fluid into the seal ring chamber 13 to maintain the pressure balance across the seal ring 18. When the pressure in the inlet chamber 15 drops below a predetermined value, the valve AV is operated by an actuator 152 to close the connection between the pipes 120 and 150 and open the connection between the pipe 120 and the pipe 124, thereby permitting fluid to flow from the seal ring chamber 13 which results in a lifting of the seal ring 18 by the piston action on the seal ring. The operation of the valve AV is controlled by a pressure switch PS and a solenoid valve SV which controls the flow of air into the actuator 152.

When the pressure in the seal inlet chamber 15 returns to a predetermined value, the valve AV is operated to permit fluid to flow from the pressure line 150 into the seal ring chamber 13 through the pipe 120, thereby restoring the seal ring 18 to its normal operating position. In the system shown in FIG. 5, as well as the system shown in FIG. 2, floating ring seals FRS, or breakdown bushings, control fluid flow from the main bearing cavity when the seal ring is moved away from the seal runner more than its normal distance.

From the foregoing description it is apparent that the invention provides a seal lift-off device which may be utilized with a controlled leakage seal of either a tapered faceplate type or a step faceplate type to prevent rubbing of the seal faces together under abnormally low pressure conditions. The device functions to return the seal members to their normal operating position when normal operating pressure conditions are restored. The lift-off device may be utilized with a seal arrangement in which the seal faceplates are retained in position by hydrostatic clamp means or with an arrangement in which the seal faceplates are retained in position by a mechanical clamp arrangement. The lift-off device or system is relatively simple in construction and operation and it may economically manufactured and installed.

Since numerous changes may be made in the above-described construction and different embodiments of the invention may be made without departing from the spirit and scope thereof, it is intend that all subject matter contained in the foregoing description or shown in the accompanying drawings shall be interpreted as illustrative and not in a limiting sense.

I claim as my invention:

1. In a fluid seal arrangement, in combination, a rotatable shaft, housing means having an annular wall spaced from the shaft to define a fluid pressure chamber within the housing, a seal runner rotatable with the shaft, an annular seal face on the seal runner, an axially movable seal ring mounted in the housing means to divide the chamber between the shaft and the wall into a seal ring chamber and a seal inlet chamber, an annular seal face on the seal ring confronting the seal face on the seal runner, means creating fluid pressure in said chambers, and control means responsive to the fluid pressure in the seal inlet chamber for creating a differential fluid pressure across the seal ring to move the seal ring away from the seal runner to prevent rubbing together said seal faces.

2. The combination defined in claim 1, wherein the control means includes pressure-operated switch means and valve means controlled by said switch means, said switch means being activated when the fluid pressure in the seal inlet chamber drops below a predetermined pressure to operate said valve means to create said differential pressure across the seal ring, and said switch means being activated when the fluid pressure in the seal inlet chamber increases above a predetermined amount to operate said valve means to eliminate said differential pressure across the seal ring.

3. The combination defined in claim 2, wherein valve means permits fluid to flow from said seal ring chamber.

4. The combination defined in claim 3, including means permitting fluid to flow into said seal inlet chamber.

5. The combination defined in claim 4, wherein the seal ring is spaced from the housing wall to provide a restricted passageway therebetween and differential pressure is created across the seal ring to move the seal ring away from the seal runner by permitting fluid to flow from the seal inlet chamber through the passageway into the seal ring chamber when the valve means is open to permit fluid to flow from the seal ring chamber.

6. The combination defined in claim 5, including additional valve means permitting fluid to flow from the seal inlet chamber into the seal ring chamber without flowing through the restricted passageway.

7. The combination defined in claim 6, wherein the additional valve means is interlocked with the valve means to permit the additional valve means to be opened only after the valve means has been opened and then reclosed.

8. The combination defined in claim 4, including seal means on the seal ring cooperating with the housing means to seal the seal ring chamber from the seal inlet chamber, and valve means permitting fluid to flow into the seal ring chamber to substantially balance the pressure in the seal inlet chamber.

9. The combination defined in claim 8, wherein the valve means is actuated by the control means to stop the flow of fluid into the seal ring chamber and permit fluid to flow from the seal ring chamber to cause the seal ring to be moved away from the seal runner.

* * * * *